(12) United States Patent
Dorsch et al.

(10) Patent No.: US 6,531,621 B1
(45) Date of Patent: Mar. 11, 2003

(54) ORGANOPOLYSILOXANE MATERIALS WHICH CAN BE CROSS-LINKED BY CLEAVING ALCOHOLS INTO ELASTOMERS

(75) Inventors: Norman Dorsch, late of Burghausen (DE), by Magda Dorsch, heir; Rudolf Heinrich, Emmerting (DE); Oswin Sommer, Salzburg (AT); Stefan Oberneder, Burghausen (DE); Wolfgang Hechtl, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/582,143

(22) PCT Filed: Sep. 10, 1998

(86) PCT No.: PCT/EP98/05777

§ 371 (c)(1), (2), (4) Date: Jul. 18, 2000

(87) PCT Pub. No.: WO99/32551

PCT Pub. Date: Jul. 1, 1999

(30) Foreign Application Priority Data

Dec. 22, 1997 (DE) .......................... 197 57 308

(51) Int. Cl.$^7$ .................................. C07F 7/08
(52) U.S. Cl. ................. 556/450; 556/453; 528/12; 528/23
(58) Field of Search ............... 556/450, 453; 528/12, 23

(56) References Cited

U.S. PATENT DOCUMENTS

| | | |
|---|---|---|
| 4,147,855 A | 4/1979 | Schiller et al. |
| 4,942,211 A | 7/1990 | Sommer et al. |
| 5,728,794 A | 3/1998 | Friebe et al. |

FOREIGN PATENT DOCUMENTS

| | | |
|---|---|---|
| AU | 4943796 | 11/1996 |
| DE | 195 07 416 C1 | 9/1996 |
| EP | 0 763 557 A1 | 3/1997 |
| FR | 2 372 203 | 6/1978 |

*Primary Examiner*—Paul F. Shaver
(74) *Attorney, Agent, or Firm*—Brooks & Kushman P.C.

(57) ABSTRACT

The invention relates to a method for producing organopolysiloxane terminated with alkoxy groups, wherein A) organopolysiloxane terminated with HO is reacted with B) alkoxysilane having at least three alkoxy groups and/or whose partial hydrolysate is made to react in the presence of C) acid phosphoric acid ester of general formula (I): $(HO)_a OP(-O-[(CR^1_2)_b-O]_c[(CR^2_2)_d]_e-L-M)_{(3-a)}$, wherein $a=1$ or 2; $R^1$ and $R^2=a$ hydrogen, methyl or hydroxyl radical; b and $d=2$ or 3; $c=$integral values from 2 to 15; $e=0$ or 1; $L=a$ radical from the group $-O-$, $-COO-$, $-OOC-$, $-CONR^3-$, $-NR^4CO-$ and $-CO-$; $R^3$ and $R^4=a$ hydrogen or a $C_1-C_{10}$-alkyl radical and $M=a$ monovalent, optionally a hydroxyl, fluorine, chlorine, bromine, $C_1-C_{10}$-alkoxyalkyl or cyano group substituted $C_1$- to $C_{20}$-hydrocarbon radical, provided that the radicals $R^1$ and $R^2$ can only be at one given time a hydroxyl radical in each hydrocarbon atom. The invention further relates to RTV-1-alkoxy masses comprising the reaction product containing organopolysiloxane terminated with alkoxy groups as the essential constituent.

12 Claims, No Drawings

ORGANOPOLYSILOXANE MATERIALS WHICH CAN BE CROSS-LINKED BY CLEAVING ALCOHOLS INTO ELASTOMERS

The invention relates to the preparation of alkoxy-terminated organopolysiloxane and to the use of this organopolysiloxane as a constituent of alkoxy RTV1 compositions.

For the purposes of the present invention, the term organopolysiloxanes is intended to include dimeric, oligomeric and polymeric siloxanes.

Organopolysiloxane compositions which can be stored while moisture is excluded and which crosslink when exposed to moisture at room temperature, with elimination of alcohols, are known as alkoxy RTV1 compositions and have been known for a long time. They essentially consist of organyloxy-terminated organopolysiloxane and, as other constituents, crosslinking agents having at least three hydrolyzable groups, catalyst and, if desired, additives. The advantage of these alkoxy RTV1 systems is that the alcohols released as cleavage products during the crosslinking are odorless, neutral and not harmful to the environment.

Alkoxy-terminated organopolysiloxane is prepared by reacting HO-terminated organopolysiloxane with alkoxysilanes. This is described in U.S. Pat. No. 4,942,211, for example. A disadvantage of this process is that the reaction requires several hours at room temperature. At elevated temperature although the reaction time is shortened it is still long enough for there to be some waiting time before the alkoxy-terminated organopolysiloxane formed can be used with other constituents to prepare alkoxy RTV1 compositions.

It is known that reactions of HO-terminated organopolysiloxane with alkoxysilanes can be accelerated by various catalysts. For example EP-A-763 557 carries out the reaction in the presence of acid dialkyl phosphoric esters. The dialkyl phosphates have to be deactivated by bases after their reaction, since otherwise the alkoxy-terminated organopolysiloxanes become depolymerized and loose their crosslinking capability.

The object on which the invention is based is to find a very simple way of preparing alkoxy-terminated organopolysiloxane for alkoxy RTV1 compositions.

The invention provides a process for preparing alkoxy-terminated organopolysiloxane, in which (A) HO-terminated organopolysiloxane is reacted with (B) alkoxysilane which has at least three alkoxy groups and/or its partial hydrolysates, in the presence of (C) acid phosphoric ester of the general formula (I)

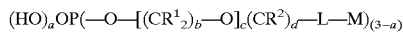

where
a is 1 or 2,
$R^1$ and $R^2$ are a hydrogen radical, methyl radical or hydroxyl radical,
b and d are 2 or 3,
c is an integer from 2 to 15,
L is a radical selected from the class consisting of —O—, —COO—, —OOC—, —CONR$^3$—, —NR$^4$CO— and —CO—,
$R^3$ and $R^4$ are a hydrogen radical or $C_1$–$C_{10}$-alkyl radical, and
M is a monovalent, unsubstituted or hydroxyl-, fluorine-, chlorine-, bromine-, $C_1$–$C_{10}$-alkoxyalkyl- or cyano- substituted $C_1$–$C_{20}$-hydrocarbon radical, with the proviso that on any carbon atom only one radical $R^1$ and $R^2$ may be a hydroxyl radical.

The process runs at temperatures as low as room temperature with an extremely high rate of reaction and selectively, and therefore immediately after mixing components (A), (B) and (C), the alkoxy-terminated organopolysiloxane formed can be used as an alkoxy RTV1 composition, if desired after admixing other constituents. There is no need to check whether the reaction has run to completion.

Another advantage of this process is that no side-reactions occur and, for example, no formation of T units or Q units is observed on a linear organopolysiloxane.

The acid phosphoric esters (C) do not have to be deactivated immediately after the reaction.

c is preferably an integer from 2 to 10, in particular 2, 3, 4 or 5. L is preferably an —O— radical. M is preferably an unsubstituted or $C_1$–$C_{10}$-alkoxyalkyl-substituted $C_1$–$C_{20}$-hydrocarbon radical, in particular an unsubstituted $C_5$–$C_{18}$-hydrocarbon radical. $R^1$ and $R^2$ are preferably a hydrogen radical. b and d are preferably 2.

The HO-terminated organopolysiloxanes (A) used are preferably linear α, ω-dihydroxypoly(diorganosiloxanes) of the general formula (II)

where
R is a monovalent, unsubstituted or fluorine-, chlorine-, bromo-$C_1$–$C_4$-alkoxyalkyl- or cyano- substituted $C_1$–$C_8$-hydrocarbon radical, and
m has a value which corresponds to a viscosity of the HO-terminated organopolysiloxane (A) of from 0.05 to 1000 Pa.s.

Examples of hydrocarbon radicals R are linear and cyclic, saturated and unsaturated; alkyl radicals, such as the methyl radical, aryl radicals, such as the phenyl radical, alkaryl radicals, such as tolyl radicals, and aralkyl radicals, such as the benzyl radical.

Preferred radicals R are unsubstituted hydrocarbon radicals having from 1 to 6 carbon atoms, particularly preferably the methyl radical.

The organopolysiloxanes (A) preferably have a viscosity of from 100 to 700,000 mPa.s, in particular from 20,000 to 350,000 mPa.s, measured in each case at 23° C.

The alkoxysilanes (B) preferably have the general formula (III)

where
$R^5$ and $R^6$ are monovalent, unsubstituted or fluorine-, chlorine-, bromine-, $C_1$–$C_4$-alkoxyalkyl- or cyano- substituted $C_1$–$C_{13}$-hydrocarbon radicals, and
μ is 0 or 1.

The partial hydrolysates of alkoxysilane (B) have been produced by hydrolyzing and condensing in particular from 2 to 4 alkoxysilanes. Examples of partial hydrolysates (B) are hexamethoxydisiloxane and hexa-ethoxydisiloxane.

Each of $R^5$ and $R^6$ is preferably an unsubstituted $C_1$–$C_6$-hydrocarbon radical, in particular a methyl, ethyl or propyl radical.

The acid phosphoric esters (C) of the general formula (I) are storage-stabilizers for the alkoxy RTV1 compositions prepared from the alkoxy-terminated organopolysiloxane. In particular, the skin formation times of the alkoxy RTV1 compositions remain virtually constant and stable, and discoloration is suppressed.

In the general formulae (I) to (III), all of the radicals R and $R^1$ to $R^8$, and all of the indices a, b, c, d, e, m and $\mu$, are identical or different, independently of one another.

In all of the formulae the silicon atom is tetravalent. For example, n+o is not more than 4.

The amounts of the acid phosphoric esters (C) used, based on 500 parts by weight of the HO-terminated organopolysiloxanes (A) are from 0.1 to 50 parts by weight, in particular from 2 to 20 parts by weight.

The alkoxysilanes (B) are preferably added in excess to the HO-terminated organopolysiloxanes (A) in terms of the stoichiometric ratios. In order to permit the reaction of the HO-terminated organopolysiloxanes (A) with alkoxysilanes (B) to run as far as possible toward completion, use may preferably be made of from 10 to 60 parts by weight, in particular from 20 to 50 parts by weight, of the alkoxysilanes (B) per 500 parts by weight of the HO-terminated organopolysiloxanes (A). The excess of alkoxysilanes (B) not consumed during the reaction is not disadvantageous in the organyloxy-terminated organo-polysiloxane and in the alkoxy RTV1 compositions, and may therefore remain in the product of the reaction. An excess of alkoxysilanes (B) acts as crosslinking component in the alkoxy RTV1 compositions.

The reaction preferably takes place at temperatures of from +20 to +50° C., in particular at room temperature. Depending on the alkoxysilane (B) used, the reaction time is from 1 to 10 minutes.

The rate of the reaction depends firstly on the reactivity of the alkoxysilane (B) used and secondly on the acid phosphoric ester (C).

At room temperature the particularly preferred duration of the reaction is from 2 to 5 min, and this is specifically an advantage for preparing RTV1 compositions by the one-pot process.

The invention also relates to alkoxy RTV1 compositions which comprise the reaction product prepared by the abovementioned process, in which a substantial constituent is alkoxy-terminated organopolysiloxane.

In addition to the abovementioned components, the alkoxy RTV1 compositions may comprise other components known per se.

Other substances which may preferably be added when preparing the alkoxy RTV1 compositions are bis-(trialkoxysilyl)-$C_1$–$C_{12}$ alkanes in which the alkoxy radicals are $OR^6$, for example bis(triethoxysilyl)ethane.

In preparing the alkoxy RTV1 compositions use may also be made of condensation catalysts, reinforcing fillers, nonreinforcing fillers, pigments, soluble dyes, fragrances, plasticizers, phosphoric esters or dimethylpolysiloxanes end-capped by trimethylsiloxy groups and liquid at room temperature, fungicides, resin-like organopolysiloxanes, including those composed of $(CH_3)_3SiO_{1/2}$ units and $SiO_{4/2}$ units, purely organic resins, such as homo- or copolymers of acrylonitrile, of styrene, of vinyl chloride or of propylene, where purely organic resins of this type, in particular copolymers of styrene and n-butyl acrylate, may have been produced by free-radical polymerization of the monomers mentioned in the presence of diorganopolysiloxane having an Si-bonded hydroxyl group in each terminal unit, corrosion inhibitors, poly-glycols, which may have been esterified and/or etherified, oxidation retarders, heat stabilizers, solvents, agents to affect the electrical properties, such as conductive carbon black, flame retardants, light stabilizers and agents to prolong skin-formation time, such as silanes having SiC-bonded mercaptoalkyl radicals, and also blowing agents, e.g. azodicarbonamide. Other substances which may be added are adhesion promoters, preferably aminoalkyl-functional silanes, such as γ-aminopropyltriethoxysilane.

It is preferable to use condensation catalysts. The alkoxy RTV1 compositions may according to the invention comprise any desired condensation catalysts among those which have been present hitherto in compositions which can be stored while water is excluded and which crosslink when exposed to water at room temperature to give elastomers.

Examples of condensation catalysts of this type are organic compounds of tin, zinc, zirconium, titanium or aluminum. Of these condensation catalysts, preference is given to butyl titanates and organic tin compounds, such as di-n-butyltin diacetate and di-n-butyltin dilaurate, and to products of the reaction of a diorganotin diacylate with a silane, each molecule of which has, as hydrolyzable groups, at least two monovalent hydrocarbon radicals which have bonding via oxygen to silicon and if desired have alkoxy substitution, or with oligomers of the same, where the tin atoms in the products of this reaction have all of their valences satisfied by oxygen atoms in the group $\equiv$SiOSn$\equiv$ and/or by SnC-bonded, monovalent organic radicals.

The alkoxy RTV1 compositions preferably comprise fillers. Examples of fillers are nonreinforcing fillers, i.e. fillers with a BET surface area of up to 50 $m^2/g$, such as quartz, diatomaceous earth, calcium silicate, zirconium silicate, zeolites, metal oxide powders, such as aluminum oxides, titanium oxides, iron oxides or zinc oxides and/or mixed oxides of these, barium sulfate, calcium carbonate, gypsum, silicon nitride, silicon carbide, boron nitride, powdered glass and powdered plastics, such as powdered polyacrylonitrile; reinforcing fillers, i.e. fillers with a BET surface area of more than 50 $m^2/g$, such as fumed silica, precipitated silica, carbon black, such as furnace black or acetylene black, and silicon-aluminum mixed oxides of high BET surface area; and fibrous fillers, such as asbestos and synthetic polymeric fibers.

The fillers mentioned may have been hydrophobicized, for example by treatment with organosilanes and/or -siloxanes or with stearic acid, or by etherifying hydroxyl groups to give alkoxy groups. It is possible to use one type of filler, or else a mixture of at least two fillers.

If reinforcing silica is used as sole filler it is possible to prepare transparent alkoxy RTV1 compositions.

The usual moisture present in the air is sufficient to crosslink the alkoxy RTV1 compositions. If desired, it is also possible for the crosslinking to be carried out at temperatures below or above room temperature, e.g. at from −5 to 10° C., or at from 30 to 50° C.

The novel alkoxy RTV1 compositions therefore have excellent suitability as, for example, compositions for sealing joints, including joints which run vertically, or for sealing spaces of, for example, clear width from 10 to 40 mm, e.g. in buildings, land vehicles, watercraft or aircraft, or as adhesives or putties, e.g. in the construction of windows or the production of display cabinets, and also, for example, for the production of protective coatings, or of elastomeric moldings, or also for the insulation of electrical or electronic equipment.

In the examples described below, all data on percentage parts are based on weight unless otherwise stated. All viscosity data moreover are based on a temperature of 25° C. Unless otherwise stated the examples below are carried out at ambient atmospheric pressure, i.e. at about 1000 hPa, and at a room temperature, i.e. at about 20° C., at [sic] a temperature which results when the reactants are brought together at room temperature without additional heating or cooling.

EXAMPLES

Example 1

500 g of a dimethylpolysiloxane which has a hydroxyl group in each terminal unit and has a viscosity of 80,000 mPa.s at 23° C. are mixed, in a planetary mixer which can operate under vacuum, with 350 g of a polydimethylsiloxane having trimethylsiloxy groups in the terminal units and having a viscosity of 100 m²/s (23° C.) and 10 g of a mixture of alkoxylated phosphoric esters of the formulae

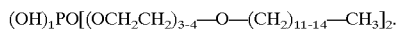

and

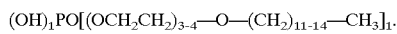

25 g of methyltrimethoxysilane are then immediately added in a single portion, followed by homogenization in vacuo for 5 minutes. The following are then added in the sequence given, using the mixing techniques usual for RTV1 compositions:

13.5 g of γ-aminopropyltriethoxysilane, 80.0 g of hydrophilic fumed silica with a BET surface area of 150 m²/g and 5.0 g of a reaction product prepared by heating a mixture of 4 parts of tetraethyl silicate and 2.2 parts of di-n-butyltin diacetate for 6 hours at 120° C. at ambient atmospheric pressure, with stirring, and at the same time distilling off the ethyl acetate produced.

After homogenization in vacuo, the compound is drawn off into moisture-proof packs. Specimens are taken at various intervals and the skin-formation times (at 23° C./50% relative humidity) determined for the elastomers prepared from these. The results achieved here are listed in Table 1.

The following mechanical properties of the elastomers were determined:

Shore A: 10; ultimate tensile strength: 1.0 N/mm²; elongation at break: 560%; tear propagation resistance: 2.7 N/mm; Stress at 100% elongation: 0.2 N/mm².

Example 2

The procedure is similar to that of Example 1. To 600 g of the α,ω-dihydroxypolydimethylsiloxane of Example 1, the following ingredients are added in the sequence given:

280.0 g of polydimethylsiloxane having —Si(CH$_3$)$_3$ end groups 10.0 g of alkoxylated phosphoric esters of Example 1

25.0 g of vinyltrimethoxysilane, 15.0 g of γ-aminopropyltriethoxysilane, 70.0 g of hydrophilic fumed silica with a BET surface area of 150 m²/g and 5.0 g of the reaction product from tetraethyl silicate and di-n-butyltin diacetate of Example 1.

The skin-formation times of the elastomers prepared therefrom are listed in Table 1.

Example 3

The procedure is similar to that of Example 1. The following ingredients are admixed in the sequence given with 500 g of the α,ω-dihydroxypolydimethylsiloxane:

380.0 g of polydimethylsiloxane having —Si(CH$_3$)$_3$ end groups, 10.0 g of the alkoxylated phosphoric ester of Example 1, 25.0 g of methyltrimethoxysilane, 10.0 g of 3-(2-aminoethylamino)propyltrimethoxysilane, 70.0 g of hydrophilic fumed silica with a BET surface area of 150 m²/g, and 4.0 g of the reaction product of tetraethyl silicate and di-n-butyltin diacetate from Example 1.

The skin-formation times of the elastomers prepared therefrom are listed in Table 1.

Example 4

The procedure is similar to that of Example 1.

500.0 g of α,ω-dihydroxypolydimethylsiloxane of Example 1, 380.0 g of polydimethylsiloxane having —Si(CH$_3$)$_3$ end groups, 10.0 g of alkoxylated phosphoric ester of Example 1, 25.0 g of methyltrimethoxysilane, 8.0 g of γ-aminopropyltriethoxysilane, 70.0 g of hydrophilic fumed silica with a BET surface area of 150 m²/g and 4.0 g of the reaction product from tetraethyl silicate and di-n-butyltin diacetate of Example 1 are mixed.

The skin-formation times of the elastomers produced therefrom are listed in Table 1.

Example 5

The procedure is similar to that of Example 1. The following are mixed:

500.0 g of the α,ω-dihydroxypolydimethylsiloxane of Example 1

380.0 g of polydimethylsiloxane having —Si(CH$_3$)$_3$ end groups, 10.0 g of the alkoxylated phosphoric ester of Example 1, 25.0 g of vinyltrimethoxysilane, 25.0 g of amino-functional siloxane: equilibration product made from aminopropyltriethoxysilane and from a condensate/hydrolysate of methyltriethoxysilane with an amine number of 2.2, 70.0 g of hydrophilic fumed silica with a BET surface area of 150 m²/g and 5.0 g of the reaction product of tetraethyl silicate and di-n-butyltin diacetate from Example 1.

The skin-formation times of the elastomers produced therefrom are listed in Table 1.

TABLE 1

| Storage time while moisture is excluded | Example 1 | | Example 2 | | Example 3 | | Example 4 | | Example 5 | |
|---|---|---|---|---|---|---|---|---|---|---|
| | RT | 50° C. | RT | 50° C. | RT | 50° C. | RT | 50° C. | RT | 50° C. |
| 7 d | 17 min | 20 min | 15 min | 20 min | 10 min | 10 min | 40 min | 42 min | 15 min | 25 min |
| 14 d | 18 min | 20 min | 17 min | 25 min | 10 min | 12 min | 38 min | 45 min | 16 min | 35 min |
| 21 d | 20 min | 25 min | 18 min | 30 min | 14 min | 17 min | 35 min | 50 min | 15 min | 30 min |

Example 6

600 g of a polydimethylsiloxane which has a hydroxyl group in each terminal unit and has a viscosity of 80,000 mPa.s at 23° C., 300 g of a polydimethylsiloxane having trimethylsiloxy groups as terminal units and having a viscosity of 100 mm$^2$/s at 23° C., and also 10 g of the alkoxylated phosphoric ester of Example 1 are mixed homogeneously in a planetary mixer which can operate under vacuum. 35 g of methyltrimethoxysilane are then immediately added, followed by further thomogenization for 5 minutes. The following ingredients are then added stepwise in succession to this premix, while the mixing technique remains that which is usual for RTV1 compositions:

- 15.0 g of γ-aminopropyltriethoxysilane,
- 70.0 g of hydrophilic fumed silica with a BET specific surface area of 150 m$^2$/g, and
- 5.0 g of the reaction product of tetraethyl silicate and di-n-butyltin diacetate from Example 1.

After homogenization at reduced pressure, the compound is drawn off into moisture-proof packs. After storage for 1 day at room temperature the skin-formation time is determined as 10 minutes (23° C./50% relative humidity). After a further 7 days of storage at 50° C. the skin-formation time is 15 minutes.

Example 7

Example 6 is repeated. However, the other ingredients added in a modified sequence to a premix of the same make-up are:

- 70.0 g of hydrophilic fumed silica with a BET specific surface area of 150 m$^2$/g,
- 15.0 g of γ-aminopropyltriethoxysilane and
- 5.0 g of the reaction product of tetraethyl silicate and di-n-butyltin diacetate from Example 1.

After homogenization at reduced pressure, the compound is drawn off into moisture-proof packs. After storage at room temperature for 1 day the skin-formation time is determined as 12 minutes (23° C./50% relative humidity). After an additional 7 days of storage at 50° C. the skin-formation time is 15 minutes.

Example 8

Example 6 is repeated. Further ingredients are added as follows to a premix of the same make-up:

- 70.0 g of a hydrophilic fumed silica with a specific BET surface area of 150 m$^2$/g and
- 5.0 g of the reaction product from tetraethyl silicate and di-n-butyltin diacetate of Example 1.

After homogenization at reduced pressure the compound is allowed to stand for 3 hours while moisture is excluded, and 15 g of γ-aminopropyltriethoxysilane are then incorporated by mixing. After a further homogenization at reduced pressure the compound is drawn off into moisture-proof packs. After storage at room temperature for 1 day the skin-formation time is determined as 12 minutes (23° C./50% relative humidity). After an additional 7 days of storage at 50° C. the skin-formation time is 15 minutes.

Example 6 to 8 show that the sequence of addition of the γ-aminopropyltriethoxysilane coupling agent has no significant effect on the skin-formation time. It is therefore not necessary for the alkoxylated phosphoric ester to be neutralized immediately by the basic coupling agent.

Example 9

550 g of a polydimethylsiloxane having terminal hydroxyl groups and a viscosity of 80,000 mPa.s at 23° C., 325 g of a polydimethylsiloxane having terminal trimethylsiloxygroups, 50 g of methyltrimethoxysilane and 10 g of the alkoxylated phosphoric ester of Example 1 are homogeneously mixed, while water is excluded, in a planetary mixer which can operate under vacuum. After about 10 minutes the following ingredients are added and mixed homogeneously into the overall composition:

- 15.0 g of γ-aminopropyltriethoxysilane,
- 73.0 g of hydrophilic fumed silica with a BET surface area of 150 m$^2$/g,
- 5.0 g of the reaction product from tetraethyl silicate and di-n-butyltin diacetate of Example 1 and
- 200.0 g of ground chalk treated with stearic acid.

After storage for 1 day at room temperature the skin-formation time is determined as 15 minutes. After a further 7 days of storage at 50° C. the skin-formation time was determined as 20 minutes.

Example 10

Example 9 was repeated but with the modification that the ground, stearic-acid-treated chalk was replaced by the same amount of untreated ground chalk. After 1 day of storage at room temperature the skin-formation time was determined as 20 minutes, and after a further 7 days of storage at 50° C. the skin-formation time was determined as 25 minutes.

Example 11

Example 9 was repeated, but with the modification that only 50 g of hydrophilic fumed silica with a BET surface area of 150 m$^2$/g were used instead of 73 g, and that the 200 g of ground chalk treated with stearic acid were replaced by the same amount of precipitated chalk treated with stearic acid and having a surface area of 19 m$^2$/g. After storage for 1 day at room temperature, the skin-formation time was determined as 15 minutes, and after a further 7 days of storage at 50° C. the skin-formation time was 25 minutes.

Example 12

The procedure was similar to that of Example 1.

| | |
|---|---|
| 95.3 g | of α,ω-dihydroxypolydimethylsiloxane of Example 1 |
| 1.2 g | of alkoxylated phosphoric ester of Example 1 and |
| 3.5 g | of methyltrimethoxysilane | were mixed in the sequence given above.

The viscosities of the mixture were measured:

| | |
|---|---|
| after 1 h | 64,000 mPa · s |
| after 2 h | 62,400 mPa · s |
| after 3 h | 60,800 mPa · s |

Example 13

Comparative Example

The procedure is similar to that of Example 1.

| | |
|---|---|
| 95.3 g | of α,ω-dihydroxypolydimethylsiloxane of Example 1 |
| 1.2 g | of di-2-ethylhexyl phosphate (as in EP-A-763 557) and |
| 3.5 g | of methyltrimethoxysilane | were mixed in the sequence given above.

The viscosities of the mixture were measured:

| | |
|---|---|
| after 1 h | 32,000 mPa · s |
| after 2 h | 12,000 mPa · s |
| after 3 h | 2000 mPa · s |

Di-2-ethylhexyl phosphate depolymerizes the alkoxy-terminated organopolysiloxane.

What is claimed is:

1. A process for preparing alkoxy-terminated organopolysiloxanes, comprising reacting (A) at least one HO-terminated organopolysiloxane (B) at least one alkoxysilane of the general formula (III)

$$R^5_\mu Si(OR^6)_{4-\mu} \tag{III}$$

where
R$^5$ and R$^6$ are independently monovalent, unsubstituted or fluorine-, chlorine-, bromine-, $C_1$–$C_4$-alkoxyalkyl- or cyano-substituted $C_1$–$C_{13}$-hydrocarbon radicals, and is 0 or 1,
$\mu$ is 0 or 1,
and/or a partial hydrolysate thereof, in the presence of (C) at least one acid phosphoric ester of the general formula (I)

$$(HO)_a OP(-O-[(CR^1_2)_b-O]_c(CR^2_2)_d-L-M)_{(3-a)} \tag{I}$$

where
a is 1 or 2,
R$^1$ and R$^2$ are a hydrogen radical, methyl radical or hydroxyl radical,
b and d are 2 or 3,
c is an integer from 2 to 15,
L is a radical selected from the group consisting of —O—, —COO—, —OOC—, —CONR$^3$—, —NR$^4$CO— and —CO—,
R$^3$ and R$^4$ are independently a hydrogen radical or $C_1$–$C_{10}$-alkyl radical, and
M is a monovalent, unsubstituted or hydroxyl-, fluorine-, chlorine-, bromine-, $C_1$–$C_{10}$-alkoxyalkyl- or cyano-substituted $C_1$–$C_{20}$-hydrocarbon radical, with the proviso that on any carbon atom only one radical R$^1$ and R$^2$ may be a hydroxyl radical.

2. A process as claimed in claim 1, in which the HO-terminated organopolysiloxane (A) used comprises linear α,ω-dihydroxypoly(diorgano)siloxanes of the general formula (II)

$$HO-[R_2SiO]_m-H \tag{II}$$

where
R is a monovalent, unsubstituted or fluorine-, chlorine-, bromo-$C_1$–$C_4$-alkoxyalkyl- or cyano-substituted $C_1$–$C_8$-hydrocarbon radical, and
m has a value which corresponds to a viscosity of the HO-terminated organopolysiloxane (A) of from 0.05 to 1000 Pa·s.

3. The process of claim 1, wherein
c is from 2 to 10,
l is —O—, and
m is an unsubstituted or $C_1$–$C_{20}$ hydrocarbon radical.

4. The process of claim 3, wherein
c is from 2 to 5,
R$^1$ and R$^2$ are H, and
b and d are 2.

5. The process of claim 1 wherein said acid phosphoric ester (C) comprises a mixture of
(C)(1) (HO)PO[(OCH$_2$CH$_2$)$_{3-4}$—O—(CH$_2$)$_{11-14}$—CH$_3$]$_2$ and
(C)(2) (HO)$_2$PO[(OCH$_2$CH$_2$)$_{3-4}$—O—(CH$_2$)$_{11-14}$—CH$_3$].

6. An alkoxy RTV1 composition which comprises the reaction product of claim 2.

7. The alkoxy RTV1 composition of claim 6 wherein said acid phosphoric ester is not separated from the reaction product.

8. The alkoxy RTV1 composition of claim 6 in which said acid phosphoric ester comprises a mixture of
(C)(1) (HO)PO[(OCH$_2$CH$_2$)$_{3-4}$—O—(CH$_2$)$_{11-14}$—CH$_3$]$_2$ and
(C)(2) (HO)$_2$PO[(OCH$_2$CH$_2$)$_{3-4}$—O—(CH$_2$)$_{11-14}$—CH$_3$].

9. The alkoxy RTV-1 composition of claim 6, further comprising a reinforcing filler having a BET surface area greater than 50 m$^2$/g, optionally a non-reinforcing filler having a BET surface area of 50 m$^2$/g or less, at least one aminoalkyl and alkoxy-functional silane, and a condensation catalyst.

10. The alkoxy RTV-1 composition of claim 9, wherein said aminoalkyl and alkoxy-functional silane comprises γ-aminopropyltriethoxysilane.

11. The alkoxy RTV-1 composition of claim 9, wherein said condensation catalyst comprises the reaction product obtained by heating a mixture of tetraethylsilicate and di-n-butyltin diacetate while removing ethyl acetate by distillation.

12. The alkoxy RTV-1 composition of claim 9, wherein said aminoalkyl and alkoxy-functional silane comprises 3-(2-aminoethylamino)propyltrimethoxysilane.

* * * * *

UNITED STATES PATENT AND TRADEMARK OFFICE
CERTIFICATE OF CORRECTION

PATENT NO.    : 6,531,621 B1
DATED         : March 11, 2003
INVENTOR(S)   : Norman Dorsch et al.

Page 1 of 1

It is certified that error appears in the above-identified patent and that said Letters Patent is hereby corrected as shown below:

<u>Column 9,</u>
Lines 23-24, after ", and" delete "is 0 or 1, $\mu$ is 0 or 1", and insert therefor
-- $\mu$ is 0 or 1, --.

Signed and Sealed this

Fifth Day of August, 2003

JAMES E. ROGAN
*Director of the United States Patent and Trademark Office*